United States Patent
Drefs et al.

(10) Patent No.: US 8,027,873 B2
(45) Date of Patent: Sep. 27, 2011

(54) TRAVEL REWARD ACCRUAL

(75) Inventors: Martin J. Drefs, Edina, MN (US); David P. Evans, Salt Lake City, UT (US)

(73) Assignee: Accenture Global Services Limited, Dublin (IE)

( * ) Notice: Subject to any disclaimer, the term of this patent is extended or adjusted under 35 U.S.C. 154(b) by 340 days.

(21) Appl. No.: 12/197,777

(22) Filed: Aug. 25, 2008

(65) Prior Publication Data
US 2009/0055271 A1    Feb. 26, 2009

Related U.S. Application Data

(60) Provisional application No. 60/957,578, filed on Aug. 23, 2007.

(51) Int. Cl.
*G06Q 30/00* (2006.01)
(52) U.S. Cl. .................................................. 705/14.27
(58) Field of Classification Search ............. 705/14, 705/14.27
See application file for complete search history.

(56) References Cited

U.S. PATENT DOCUMENTS

| | | | |
|---|---|---|---|
| 6,085,976 A * | 7/2000 | Sehr .............................. | 235/384 |
| 6,609,658 B1 * | 8/2003 | Sehr .............................. | 235/384 |
| 7,617,136 B1 * | 11/2009 | Lessing et al. .................. | 705/28 |
| 2001/0016825 A1 * | 8/2001 | Pugliese et al. .................. | 705/5 |
| 2002/0032609 A1 * | 3/2002 | Wilkman ........................ | 705/14 |
| 2002/0038250 A1 | 3/2002 | Heintzeman et al. | |
| 2003/0171992 A1 * | 9/2003 | Blagg et al. .................... | 705/14 |
| 2005/0038741 A1 | 2/2005 | Bonalle et al. | |
| 2005/0131792 A1 | 6/2005 | Rowe | |
| 2006/0111973 A1 * | 5/2006 | Brown et al. ................... | 705/14 |
| 2006/0184419 A1 * | 8/2006 | Postrel .......................... | 705/14 |
| 2006/0253320 A1 | 11/2006 | Heywood | |
| 2007/0192186 A1 * | 8/2007 | Greene et al. .................. | 705/14 |

FOREIGN PATENT DOCUMENTS
WO    WO 2006138595 A2 * 12/2006

OTHER PUBLICATIONS

"United Announces Important Change to Its Mileage Plus Frequent Flyer Program," PR Newswire, Jan. 19, 2007.*
"AirTran Extends 'A-Plus' Travel Reward Program," Business Wire, Oct. 22, 1998.*
Beirne, Mike. "Airlines seek new ways to reward frequent flyers." Brandweek, Oct. 2, 2006.*
Howe, Peter. "Frequent-Flyer Restrictions Not Sitting Well Travelers Find It Hard To Cash In Miles for Seats," Boston Globe, Jun. 4, 2006.*
Walsh, Chris. "United adds frequent flier perks Its credit card users can cash in points for tickets, rooms," Rocky Mountain News, May 2, 2006.*

* cited by examiner

*Primary Examiner* — Michelle Tarae
(74) *Attorney, Agent, or Firm* — Fish & Richardson P.C.

(57) ABSTRACT

The subject matter of this specification can be embodied in, among other things, a method that includes receiving an indication that a passenger is boarding a carrier for a first segment of a travel itinerary, determining an amount of travel reward points to associate with the first segment, and outputting, at a time substantially concurrent with the boarding of the carrier for the first segment, the amount of the travel reward points to a travel reward system so that the travel reward points are available for redemption by the passenger on a second segment of the travel itinerary.

21 Claims, 4 Drawing Sheets

TRAVEL REWARD ACCRUAL

CROSS-REFERENCE TO RELATED APPLICATIONS

This application claims priority from U.S. Provisional Application Ser. No. 60/957,578, filed Aug. 23, 2007 and entitled Travel Reward Accrual, the contents of which are incorporated herein by reference.

TECHNICAL FIELD

This instant specification relates to rewarding travelers using points associated with travel.

SUMMARY

In general, this document describes modifying an amount of reward points associated with a loyalty program at a time substantially concurrent with when the reward points are earned. The systems and techniques described here may provide one or more of the following advantages. First, reward points can be accrued in substantially real-time with the earning of the reward points. Second, reward points can be immediately viewed by a traveler accessing his or her travel rewards account. Third, reward points can be redeemed for upgrades in subsequent legs of a travel itinerary.

In a first general aspect, a computer-implemented method for updating travel reward points during travel so that the travel reward points are redeemable at a time substantially concurrent with when the travel reward points are earned is described. The method includes receiving an indication that a passenger is boarding a carrier for a first segment of a travel itinerary, determining an amount of travel reward points to associate with the first segment, and outputting, at a time substantially concurrent with the boarding of the carrier for the first segment, the amount of the travel reward points to a travel reward system so that the travel reward points are available for redemption by the passenger on a second segment of the travel itinerary.

In a second general aspect, a system for updating travel reward points during travel so that the travel reward points are redeemable at a time substantially concurrent with when the travel reward points are earned is described. The system includes one or more computers having an accrual module to receive an indication that a passenger is boarding a carrier for a first segment of a travel itinerary, a rules engine to determine an amount of travel reward points to associate with the first segment, and a database to output, at a time substantially concurrent with the boarding of the carrier for the first segment, the amount of the travel reward points to a travel reward system so that the travel reward points are available for redemption by the passenger on a second segment of the travel itinerary.

In yet another general aspect, a computer-implemented method for updating travel reward points so that the travel reward points are available for redemption at a time substantially concurrent with when the travel reward points are earned is described. The method includes receiving, at a server, a notification that a passenger is boarding at a carrier for a first segment of travel of a travel itinerary, determining, using a rules engine executed by the server, an amount of travel reward points to associate with the first segment of travel, and transmitting a request to credit the determined amount of travel reward points to an electronic account associated with the passenger. The crediting is substantially concurrent with the boarding of the carrier for the first segment so that the travel reward points are available for redemption by the passenger before the first segment of travel is completed.

The details of one or more embodiments of the rewards feature are set forth in the accompanying drawings and the description below. Other features and advantages of the rewards feature will be apparent from the description and drawings, and from the claims.

DESCRIPTION OF DRAWINGS

Like reference symbols in the various drawings indicate like elements.

DETAILED DESCRIPTION

This document describes systems and techniques for substantial real-time posting and updating of travel reward points to a customer's frequent flyer account. The real-time posting and updating of the travel reward points can occur at a time substantially concurrent with when the travel reward points are earned. For example, a customer can be a member of a loyalty program where the customer is assigned to a frequent flyer account that can include, along with other information, a total number of travel reward points accrued up to a certain point in time. In one example, a customer's travel itinerary can include a flight from one destination to another that can be divided into segments. A record can be kept of the customer boarding each segment of the flight. If the customer is a member of a loyalty program, the customer can have a frequent flyer account where travel reward points can be accrued and redeemed for travel by the customer. The travel reward points earned on a flight segment can be posted to the customer's frequent flyer account concurrent with them boarding the flight segment. Once the customer has boarded the aircraft for the first segment of the flight, the customer's total travel reward points available for redemption can reflect that the travel reward points have been earned for the first segment. The customer may then choose to redeem travel reward points on the next flight segment because the customer's accrued number of travel reward points—including the travel reward points earned for the first segment—is available for redemption.

Figure 1:
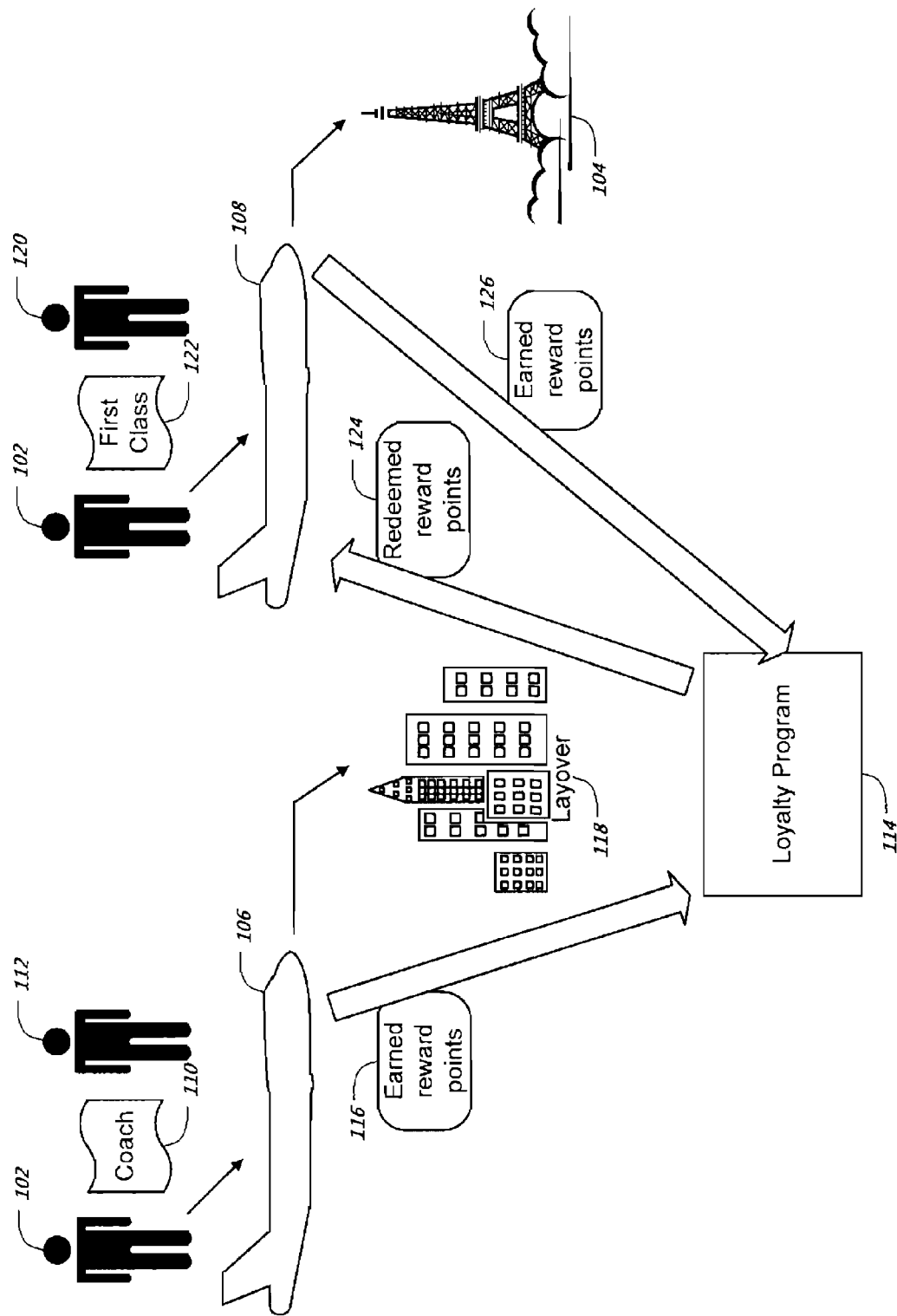
FIG. 1 is a diagram of an example of real-time point posting.

FIG. 1 is a diagram of an example of real-time point posting. In the example of FIG. 1, a customer 102 is a member of a loyalty program 114 and is traveling to destination 104 by airplane. In order for the customer 102 to reach destination 104, the customer's flight may be divided into two segments: a first flight segment 106 and a second flight segment 108. In this example, the customer 102 checks in with an airline and receives a valid boarding pass 110 for first flight segment 106. The customer 102 hands the boarding pass 110 to an airport gate agent 112. The agent 112 can record customer 102 boarding the first flight segment 106 (e.g., the agent 112 can scan a barcode printed on boarding pass 110 that indicates the passenger is boarding) and can allow the customer 102 to board the aircraft.

A number of earned travel reward points 116 for first flight segment 106 can be posted to a frequent flyer account associated with the customer 102, who is a member of the loyalty program 114, concurrent with the customer 102 boarding the first flight segment 106. At this time, the accrued travel reward points in the customer's frequent flyer account can be updated.

The customer 102 completes travel on the first flight segment 106 and arrives at layover 118. In one example, prior to boarding the first flight segment 106, the customer 102 may not have had enough travel reward points in the customer's frequent flyer account to qualify for a seat upgrade on the second flight segment 108. However, after boarding the first flight segment 106, the customer 102 may now have earned enough travel reward points to qualify for a seat upgrade (e.g., from coach to first class) on the second flight segment 108. The customer 102 can redeem the necessary amount of travel reward points 124 to upgrade his or her seat and receive boarding pass 122 indicating the upgrade. For example, an airport gate agent 120 (or other airport employee) can access the frequent flyer account of customer 102, deduct the number of travel reward points needed to upgrade from coach to first class on the second flight segment 108, and issue the customer 102 a boarding pass 122 for the second flight segment 108. The redeemed reward points 124 will be deducted from the frequent flyer account of customer 102 substantially concurrent with the reward points' redemption. At this time, the accrued amount of travel reward points in the customer's frequent flyer account can be updated.

As shown in the example of FIG. 1, the customer 102 can hand the boarding pass 122 to the gate agent 120 and board the aircraft for the second flight segment 108. The gate agent 120 can record customer 102 boarding the second flight segment 108 (e.g., inputs that the customer has boarded the plane using a keyboard attached to a terminal that interfaces with an airline management system). The number of earned travel reward points 126 for the second flight segment 108 can be posted to the frequent flyer account of customer 102 concurrent with them boarding the second flight segment 108. At this time, the accrued amount of travel reward points in the customer's frequent flyer account can be updated.

The number of travel reward points earned on a flight segment can be based on rules associated with the loyalty program. In some implementations, the rules can be in the form of base rules that may use criteria to determine an amount of points to award a traveler. For example, the criteria can include a transaction date (e.g., a date that tickets were purchased), booking channel (e.g., online, call center, and travel agent ticket purchases, etc.), booking date range (e.g., dates of travel), market (e.g., travel origin and destination combinations), customer recognition level (e.g., loyalty member status level such as silver, gold, or platinum), travel origin (e.g., airport or city), travel destination (e.g., airport or city), and days of the week (e.g., flights are scheduled on a Tuesday).

In some implementations, the base rules can be modified according to exceptions, such as promotions sponsored by an airline. For example, an airline may run a promotion for the Minneapolis/St. Paul to New York City travel market, where flights between the two cities booked in the month of May with travel occurring during the month of July can earn triple award points.

In some implementations, the number of travel reward points earned for a flight segment can be based on the distance flown during the segment. In other implementations, the number of points earned can be based on the distance flown during the segment as well as any bonus that may be applied. For example, an airline may run a special for a period of time on certain flight segments where the reward points earned may be doubled.

For example, a customer (e.g., customer 102) living in Minneapolis, Minn. plans a trip to Paris, France. The flight from Minneapolis/St. Paul to Paris can include two segments. The first flight segment can be a flight from Minneapolis/St. Paul International Airport to New York's JFK International Airport where the customer can have a short layover. The second flight segment can be a flight from JFK Airport to Charles de Gaulle International Airport in Paris, France. When the customer checks in for both flight segments in Minneapolis, the customer may like to upgrade his or her seat on the second flight segment from coach class to first class, however, the customer may not have sufficient travel reward points (e.g., the customer has 13,446 travel reward points in the customer's frequent flyer account and 15,000 points are needed to upgrade). If possible, the customer prefers to travel first class on the second flight segment as it is an approximately seven hour transatlantic flight with next day arrival.

The customer then travels on the first flight segment from Minneapolis/St. Paul to New York in coach class. When the customer boards the first flight segment, the customer's frequent flyer account is credited, in substantially real-time, with 2,054 travel reward points. The points reflect double the flying distance, in miles, from Minneapolis/St. Paul Airport to JFK Airport as the airline is currently running a promotion that doubles the number of points earned for travel between Minneapolis/St. Paul and New York City. Also, at this time, the accrued travel reward points are updated to a new value of 15,500 points. When the customer arrives in New York at JFK Airport, he or she may have a layover before boarding the second flight segment from New York to Paris. The customer now has accrued enough travel reward points to upgrade the customer's seat on the second flight segment from coach class to first class (e.g., 15,000 points for the upgrade). The customer can have an airport gate agent perform the upgrade, dependent, for example, on the availability of the first class seat. Once the upgrade has been performed, the customer's accrued travel reward points can be adjusted, in substantially real-time, to reflect the number of miles used for the upgrade (e.g. the customer will have 500 travel reward points remaining in the customer's frequent flyer account). The customer can earn additional travel reward points upon boarding the second flight segment from JFK Airport to Charles De Gaulle Airport (e.g., 3,640 travel reward points).

In another example, a customer, whose travel itinerary includes two flight segments, may earn enough travel reward points on the first flight segment to upgrade the customer's loyalty program membership level (e.g., gold to platinum membership level) for the second flight segment. The upgraded membership level may allow the customer to be eligible for travel benefits on the second flight segment (e.g., seat upgrade, pre-boarding, free snack) that the customer was not eligible for on the first flight segment.

Figure 2:
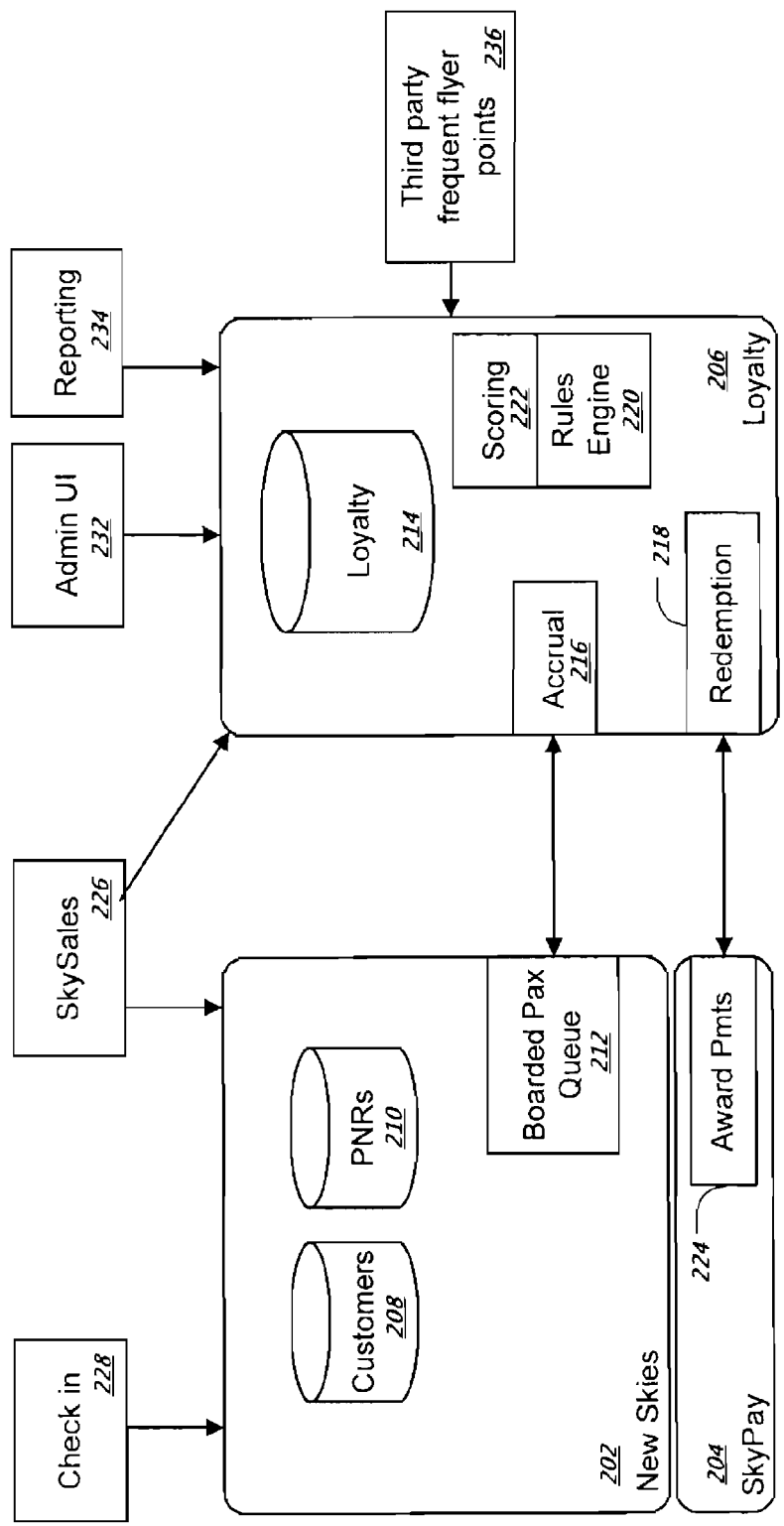
FIG. 2 is a block diagram of an implementation of an example system for real-time point posting.

FIG. 2 is a block diagram of an implementation of an example system 200 for real-time point posting. The system 200 can be used by an airline, for example, to manage reservations and ticketing for a customer base. The system 200 can include New Skies module 202, SkyPay module 204, and loyalty module 206. New Skies module 202 can perform, for example, customer-centric reservation and distribution activities (e.g., internet booking, call center, web services) for the airline. In the example of FIG. 2, the SkyPay module 204 can manage, for example, payment processing for purchasing tickets and managing flight segment upgrades. The loyalty module 206 can manage, for example, an airline loyalty program.

In the implementation of FIG. 2, the New Skies module 202 can include a customer database 208, passenger name records (PNRs) 210, and a boarded passenger (pax) queue 212. The customer database 208 can include, but is not limited to, information about a customer such as name, address, phone number, email address, and frequent flyer account number (if any), and other information associated with a customer. The passenger name records 210 can include, but is not limited to, travel details for a customer such as flight numbers, travel dates, segments flown, miles flown, and other information associated with the travel details for a customer. The boarded pax queue 212 can include, but is not limited to, information related to passenger boarding such as the customer's frequent flier ID, flight number, date and time of the flight, check in source, the origin and destination cities for the flight, and other related passenger boarding information, examples of which are shown in Table 1.

TABLE 1

| Field | Field description | Data Type | Type | Required or Optional | Remark |
|---|---|---|---|---|---|
| 1 | RequestDate | Datetime | N | R | |
| 2 | FrequentFlierID | string (20) | A | R | |
| 3 | ProgramCode | string (3) | A | R | |
| 4 | RecordLocator | string (12) | A | R | |
| 5 | BookingDate | Datetime | A | R | |
| 6 | AirlineCode | string (3) | A | R | Marketing carrier |
| 7 | OperatingAirlineCode | string (3) | A | R | |
| 8 | FlightNumber | string (4) | N | R | |
| 9 | OpSuffix | string (1) | A | O | |
| 10 | DepartureDate | Datetime | N | R | |
| 11 | ArrivalDate | Datetime | N | R | |
| 12 | DepartureStation | string (3) | A | R | |
| 13 | ArrivalStation | string (3) | A | R | |
| 14 | CheckInSource | string (10) | A | R | |
| 15 | FareBasis | string (8) | A | R | |
| 16 | FareClass | string (8) | A | R | |
| 17 | CurrencyCode | string (3) | A | R | |
| 18 | ChannelType | Enumeration | N | R | same with NS |
| 19 | FareAmount | Decimal | N | R | |
| 20 | BasePrice | Decimal | N | R | |
| 21 | TotalPrice | Decimal | N | R | |
| 22 | PaxType | String | A | R | |

The loyalty module 206 can include a loyalty database 214, an accrual module 216, a redemption module 218, a rules engine 220, and a scoring module 222. The loyalty database 214 can include information about customers that are members of the airline's loyalty program. This information can include, but is not limited to, data provided by the customer database 208 (e.g., customer name, address, phone number, email address, etc.) as well as data related to the customer's frequent flyer account such as the account number, accrued miles to date, redeemed miles to date, and other account activity. The loyalty database 214 may also include customer preferences such as seat preferences (e.g., window or aisle), food preferences (e.g., vegetarian meals), and any other special travel needs (e.g., wheelchair needed at the gate).

The accrual module 216 can interface to the boarded pax queue 212, and the accrual module 216 can receive an indication that a customer has boarded a plane for a flight segment. For example, when a gate agent scans a barcode on a customer's ticket, an indication that the customer has boarded is sent to the boarded pax queue 212 through the New Skies 202 system. The boarded pax queue 212 can issue a message when this event occurs to the accrual module 216 indicating the customer has boarded the flight segment.

In some implementations, the accrual module 216 may also receive from the boarded pax queue 212 other details about the flight segment boarded by the customer such as miles assigned to the segment, flight number, date and time, and origin and destination cities. Examples of this information are shown in Table 1.

The accrual module 216 can access the rules engine 220 and the scoring module 222, passing the information received from the boarding pax queue 212 to the rules engine 220 to determine an amount of reward points with which to credit the customer. The scoring module 222 of the rules engine 220 can use base rules and any applicable exception rules to calculate the travel reward points a customer has earned based on the customer's travel miles and other information.

The earned travel reward points can be posted by the accrual module 216 to the customer's account on the loyalty database 214. The total reward points in the customer's frequent flyer account can then be adjusted accordingly. Therefore, a customer can accrue travel reward points on individual segments of a flight in substantially real-time.

As described previously, in some implementations, a rule can be based on a base rule or a rule can be based on a base rule in combination with an exception rule, such as an award points promotion sponsored by an airline. For example, the rules engine 220 can include a base rule where customers of all loyalty levels traveling from Minneapolis/St. Paul Airport to JFK Airport can receive travel reward points equal to the distance traveled. A promotion may modify the base rule such that a customer can earn double reward points for flight segments from Minneapolis/St. Paul Airport to JFK Airport during the month of July 2007.

The redemption module 218 can be used to redeem travel reward points from a customer's frequent flyer account in the loyalty database 214. In some implementations, the redeemed reward points can be used by an award payment module 224 included in the SkyPay module 204 to, for example, supplement or completely cover the cost of purchasing a ticket. In another implementation, the redeemed reward points can be used to cover the cost of a seat upgrade for a flight segment.

A customer, or a representative for the customer (e.g., an airport gate agent), can use SkySales module 226 to book flights online via the internet. The Sky Sales module 226 interfaces to the New Skies module 202, which includes information about the customer in the customer database 208. The travel itinerary booked by the customer using the SkySales module 226 can be added to the passenger name records 210.

The SkySales module 226 can also interface to the loyalty module 206. In some implementations, this can allow the customer to view his or her frequent flyer account information during the booking of flights. For example, the SkySales module 226 can help the user determine if the user has enough travel points to redeem them for a free ticket. In another example, the SkySales module 226 can help the user determine if the user is eligible for seat upgrades on any of the flight segments, dependent upon the substantially real-time accrual of travel reward points.

In other implementations, the customer may access an interface for the loyalty module 206 (not shown) to determine an amount of earned travel reward points or what goods are available for redemption based on the earned points.

A check in module 228 can be used to transmit an indication that a traveler has boarded. For example, a barcode reader can be interface with the check in module 228 so that when a gate agent scans in a passenger's ticket, the boarding information is transmitted to New Skies 202.

In some implementation, the admin UI 232 can be used by an administrator to manage the loyalty module 206. For example, the admin UI 232 can be used to update the base rules and exception rules included in the rules engine 220. In some implementations, the admin UI 232 can allow an administrator to add new loyalty customers to the loyalty database 214 or to modify the profiles and accounts of current loyalty customers in the loyalty database 214.

Reporting module 234 can generate reports that may include information in the loyalty database 214. For example, the reporting module 234 can prepare and send monthly frequent flyer account statements to customers. In some implementations, the reporting module 234 can prepare reports that can include statistical information that may be used for analysis by the airline (e.g., number of loyalty program members that qualified for a particular promotion included in the rules engine 220).

A third party frequent flyer points module 236 can interface to the loyalty module 206. The interface 236 can allow a customer to receive credit for travel rewards earned from a third party (e.g., a rental car agency, a hotel). For example, a customer that rents a car from Hertz may be able to earn reward travel points that can be credited to the customer's frequent flyer account in loyalty database 214.

In some implementations, a rules tester (not shown) can be used to test the rules and promotions included in the rules engine 220 prior to the rules being applied to customers. Performing these tests can prevent abnormal calculations of earned travel reward points (e.g., zero) and possible unexpected travel reward point calculations based on interactions between base rules and exception rules.

For example, a Jane Deer decides to travel from Minneapolis, Minn. to Paris, France during June of 2007. Jane is a member of a loyalty program for OnTime Airlines. Jane can use SkySales module 226 for OnTime Airlines to book her round trip flight from Minneapolis to Paris. Jane decides to travel from Minneapolis/St. Paul International Airport to Charles De Gaulle Airport. The flight can be divided into two segments: Minneapolis/St. Paul Airport to JFK Airport in New York, and JFK Airport to Charles De Gaulle Airport. While using the SkySales module 226 to book her flights, Jane notices that the current number of travel reward points in her frequent flyer account (e.g., 12,000) is not enough to upgrade her seat from coach to first class for any segment of the flight (e.g., Jane needs 15,000 points for the upgrade). However, after completing travel on the first flight segment Jane will have earned sufficient travel reward points to upgrade her seat on the second flight segment. This can occur because OnTime Airlines is running a promotion during the month of June where travelers traveling to Europe from the United States can earn triple reward points on the domestic segment of the travelers' flights.

The day of departure for Paris, Jane arrives at the Minneapolis/St. Paul Airport with her boarding passes. At the gate, Jane hands her boarding pass for the first flight segment to an airport gate agent. The agent can scan the barcode on the boarding pass, and boarding information is transmitted from a barcode reader to an airline management system (e.g., New Skies) via the check in module 228. The boarding information can include information obtained from the scan of the barcode. In some implementations, the boarding information includes or is linked to a customer identification number, a passenger name record ID, a frequent flyer account number, or a flight number. The boarding information can be used to record the event of Jane's boarding in the boarding pax queue 212. As described above, other information as shown in Table 1 may also be included in the information placed on the boarding pax queue 212.

The boarding pax queue 212 can pass a message indicating Jane's boarding (and optionally, other information, such as the amount of miles to be flown in this flight segment, the flight number, Jane's frequent flyer account number, or other information shown in Table 1) to the accrual module 216. The accrual module 216 can pass all or part of the information to the rules engine 220. The rules engine 220 can determine how the travel reward points for the first flight segment can be calculated. The scoring module 222 within the rules engine can access an appropriate base rule (e.g. equal travel reward points per miles flown), an exception rule (e.g., triple reward points), and corresponding parameters, such as the number of miles flown on the first flight segment (e.g., 1,027) and calculate the total reward points that can be posted to Jane's frequent flyer account (e.g., 3,081 points).

In some implementations, the scoring module 222 can also pass this information to the accrual module 216, which can post it to Jane's frequent flyer account. The accrual module 216 can update the travel reward points in Jane's frequent flyer account to 15,081 points (12,000 previous points+3,081 earned points for the first flight segment).

In this example, Jane lands at JFK Airport for a short layover until her next flight leaves for Paris. She gives her boarding pass for the second flight segment to an airport gate agent and requests an upgrade to first class for the second flight segment to Paris. Using SkySales module 226, the agent can access Jane's customer account information included in the customer database 208, her travel itinerary included in passenger name records 210, and her frequent flyer account information included in loyalty database 214. The gate agent can redeem 15,000 travel reward points from Jane's frequent flyer account to upgrade Jane's seat from coach to first class. The redemption module 218, interfacing to award payments module 224, can redeem Jane's travel reward points for a seat upgrade on the second flight segment. The redemption module 218 can adjust the amount of travel reward points in Jane's frequent flyer account to reflect the redemption (e.g., Jane's travel rewards balance is now 81 points). The airport gate agent can reissue a boarding pass to Jane reflecting her seat upgrade from coach to first class.

When Jane boards the second flight segment, the airport gate agent can scan the barcode on the boarding pass. This may initiate a process similar to the process described above in association with the scanning of Jane's boarding pass for the first segment (e.g., Jane may accrue travel reward points at substantially the same time that the points are earned, namely, upon boarding the flight for the second segment).

Figure 3:
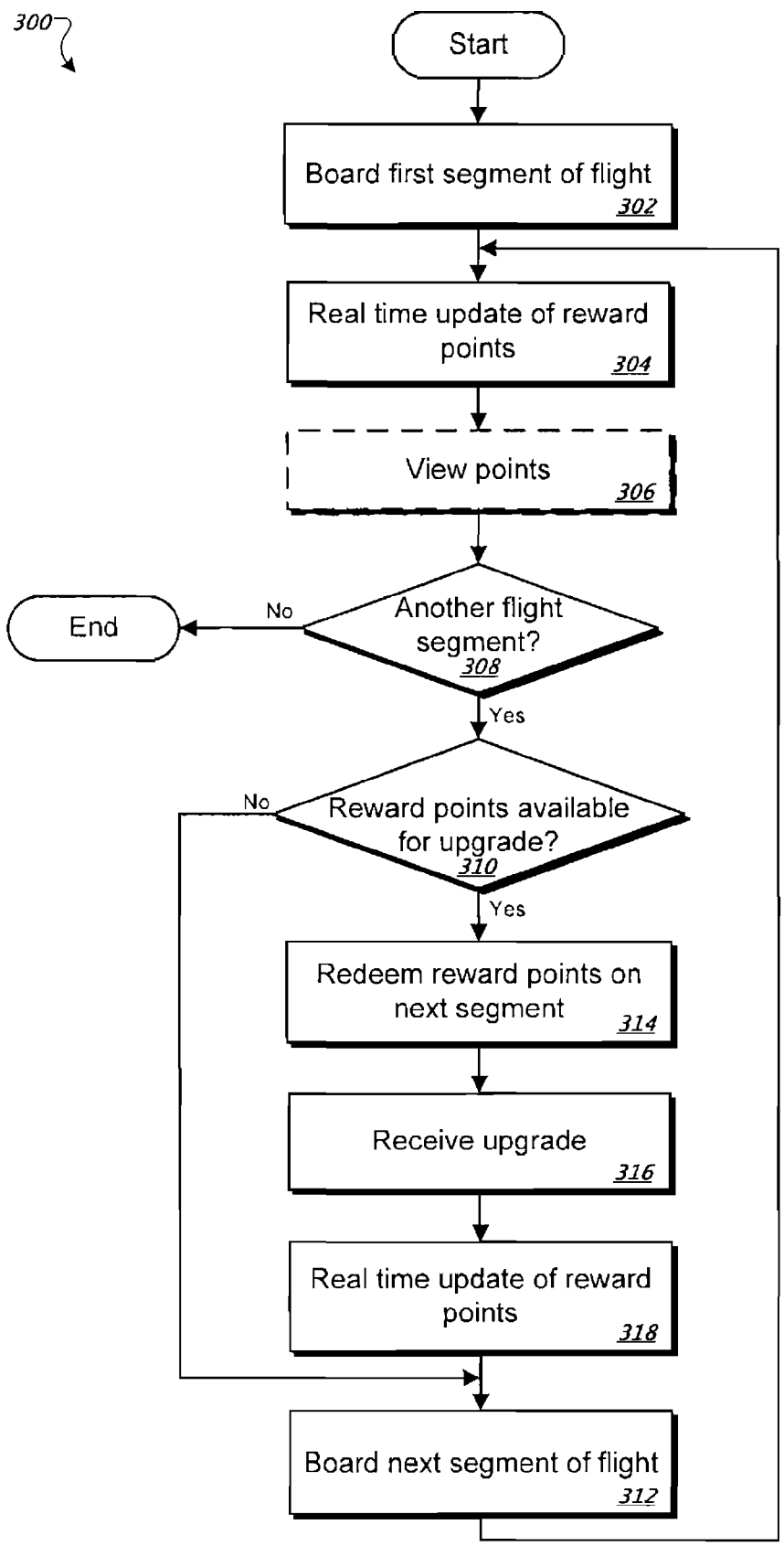
FIG. 3 is a flow chart of an example process for real-time point posting.

FIG. 3 is a flow chart of an example process 300 for real-time point posting. The process 300 may be performed, for example, by a system such as the system 200 and, for clarity of presentation, the description that follows uses the system 200 as the basis of an example for describing the processes. However, another system, or combination of systems, may be used to perform the process 300.

In the implementation shown in FIG. 3, the process 300 includes a flight with two segments. The process is not limited to two flight segments but can be used for flights with more or less than two flight segments. The process 300 starts when the customer boards the first segment of the flight (step 302). Upon boarding, the reward points for the customer are updated in substantially real-time (step 304). The updating of the reward points for the customer was described with reference to FIG. 2.

The customer can choose to view his or her reward points (step 306). For example, the SkySales module 226 can be used by the customer to access the customer's loyalty account and view the accrued travel reward miles. If the customer is not flying on another flight segment (step 308), the process 300 ends. If the customer is flying on another flight segment (step 308), the customer can check if he or she has accrued enough travel reward miles for an upgrade (step 310). If not, the customer can board the next flight segment (step 312) and the process 300 continues to step 304. If the customer has enough accrued travel reward miles for an upgrade (step 310), the customer can redeem the travel reward points on the next flight segment (step 314). The customer can then receive a reward, such as an upgrade, (step 316) for the flight segment. The reward points for the customer can be updated in real-time (step 318). For example, the amount of points redeemed can be debited from the customer's frequent flyer account. Next, the customer can board the next segment of the flight (step 312), and the process 300 continues to step 304 until the customer does not have any remaining flight segments.

In some implementations, the customer may disembark the plane after boarding. For example, this can occur if there is a problem with the aircraft and it cannot be used for the flight segment. Upon disembarking, an airport gate agent can enter into the airport management system that the plane is being de-boarded (or, for example, the agent can rescan individual de-boarding passengers) and the travel reward points for the customer(s) for the flight segment will be decremented in real-time. Therefore, the reward points credited to the customer's frequent flyer account when the customer boarded will be deducted upon the customer's de-boarding.

In some embodiments, a travel reward system, such as the systems 100, 200, implements a real-time interface for a travel reservation system that provides information on passengers boarding or unboarding. The interface can be implemented via a queue, such as the boarded pax queue 212. For example, each time a passenger's status goes to Checked In and Boarded, that pax and flight data (or the passenger name record (PNR) for the passenger) may be put in a queue that a loyalty system (e.g., system 206) can read and process in substantially real-time. In addition, if the status goes from checked in and boarded to NOT boarded, that transaction may placed in the queue with an indicator of unboarding so the loyalty system can "un-post" that passenger's activity within the loyalty system.

In one example, a user is an airport gate agent. The airport gate agent may be responsible for boarding passengers on to the flight. The airport gate agent can also keep track of customers who unboard the aircraft and would record that in the passenger's PNR in the reservation system.

The Loyalty system can track customer activity, and can process the boarded and unboarded passengers to determine any applicable loyalty points that apply. In one example, the passenger boards the aircraft, and their lift status is set to boarded. Also, if the passenger unboards the aircraft and thus the flight, the lift status would be changed by the airport agent from boarded to not boarded.

In another example, the following events can occur in the management of loyalty points by a loyalty system. Passenger boards the aircraft. The system sets the Lift status to "boarded." The reservation system can recognize the boarded passenger and place the transaction with appropriate detail for the loyalty system to access on a new queue. The data in the transaction can include the fields such as those described in the table 1 above. The loyalty system can then read the queue and process the transaction using its scoring and accrual engine.

In another example, the passenger unboards the aircraft. An airport agent updates the passengers PNR record to be not boarded. The reservation system recognizes that the status has changed from boarded to not boarded, and places the transaction with appropriate detail for loyalty system on a new queue along with an "unboarded" indicator. The transaction may again include some or all of the fields of table 1. The loyalty system can then read the queue and process the transaction against its scoring and accrual engine to un-post any previously applied loyalty points for the passenger on this flight.

In some implementations, the reservation system (e.g., New Skies 202) includes a central customer database with address, phone numbers, email addresses, etc. The Loyalty system can include a supplemental database of loyalty activity for customers who are members of a loyalty program.

The system (e.g., system 100 or 200) can track customer travel activity in real-time. Flights can be triggered for posting when the passenger boards the aircraft. Other activities post as the activity is "used" which for most other components will mean receive of a batch file from the supplier with the usage data. The system can track dollars spent, miles flown, segments flown, add-on services and travel components "used" over a period of time (e.g., this calendar year, last 12 months (rolling), lifetime, etc.).

The system can differentiate customer award points' postings by type and source and description. For the purposes here, "type" is one of the following items. Source indicates the source of the points being posted—either the airline or a 3rd party vendor such as a hotel chain. The description field can contain a description for the specific activity. An example for air would be "MSP-SLC Flt 1234 L1 in Y class". In some implementations the "types" can include air—host carrier, air—partner carrier, hotel, car rental, travel insurance, activity/event, package purchase (i.e. dynamic packaging), and misc. adjustment—need comments field for call center agent to indicate reason.

The system can provide web page templates for on-line pages for a carrier operator's web site (e.g., airline.com). The templates can include functionality for providing loyalty member account information including customer level, current award points balance, etc. The functionality may also include providing a detailed listing of award activity both earned and redeemed points. For example, a loyalty member may be able to query based on start and end date ranges with default settings configured in the page by a travel carrier operator as part of a sales module customization associated with the system. The page may default to dates (e.g., starting 1 month ago, and ending on current date).

In some implementations, award redemptions can be performed online or through calling into a call center. Award redemption may be configurable based on a particular metric upon which the airline chooses to base their awards. For example, one such configuration includes a voucher-based solution which can utilize an existing voucher infrastructure for redeeming award vouchers. The loyalty can call a voucher API to create a voucher for the customer using a specific fare class and voucher type set up for awards. In another example configuration, the configuration can include a point-based solution, where fares have a point value and revenue value, and award redemption is directly from the points available rather than the middle step of voucher creation and then redemption.

The system may facilitate multiple member levels or tiers—standard, VIP, super VIP, etc. that are automatically triggered when a customer's activity reaches configurable thresholds for each level. Configuration of point levels for each tier can be maintained within the loyalty system. In some implementations, New Skies has configuration for levels as well which the system can keep in synch. The loyalty system can update the customer database in New Skies whenever the customer recognition level changes for a given member.

In some implementations, the system can provide on-line mechanism to request credit for past flights flown. This may include verification that the customer on the flown flight is in fact the person requesting the credit. This request will be placed on a queue which an airline agent will need to work though and post appropriate points to the customer's account if applicable.

The system can provide call center "admin" functionality. Access can be limitable based on user/role. The functionality can include adjusting customer accounts for whatever reason such as customer service issue or missed flight credit, "merging" accounts when someone mistakenly signs up twice, "transferring" of points between accounts. The system can include the ability to review a "queue" of items needing manual review which can include duplicate points postings (same activity on the same day) and remove the duplicate where applicable, and missing flight credit requests where the verification information didn't match the flown flight request.

In some implementations, the system can display loyalty info related to a given passenger for ticket counter agents, call center and through the booking API. For example, information can be provided for awards redeemed/used based on fare class. The system can provide external accessible web service (s) for lookup of loyalty status and other info by a 3rd party application such as a kiosk application. The system can also provide a mechanism to enroll in the loyalty program through various means (e.g., online during a booking process and after completing the booking, online through an enrollment page even if not booking travel, from the call center, from 3rd party system using web service, etc).

In some implementations, the system provides a flexible means for the airline to set up rules for award points based on flight markets, including the ability to configure rules for promotions to award extra points. The rules engine can enable an airline analyst to configure the rules through a desktop UI. For example, the rule criteria can include transaction type—air, hotel, car, etc.; transaction date—such as flight departure date for air transactions; booking channel—online, call center, travel agent, GDS, etc; booking date range—start and end date for the booking; market—e.g., origin and destination combinations (MSP/SLC for example); customer Recognition Level—e.g., silver, gold, platinum; by origin—any flight originating in a given airport; by destination—any flight arriving at a given airport on the host carrier; by days of the week; by fare class; Marketing airline; Operating airline; and Fare class.

In some implementations, each rule can have a separate calculation performed for qualifying points and bankable points. For example, calculation could be a fixed amount or a % of the base award for that market. Multiple rules can apply to a single transaction. Each rule output can be stored as a separate account activity record. A reference table can be maintainable by the carrier operator for the base award points by market. Each rule can have a description which will be stored with the activity record. The system may provide ability to email passenger statements once per month. Also, the system may send a welcome email to the person upon signup for the loyalty program.

In some implementations, the system can support expiration of credits/points by a configurable length of time after the activity occurred. In other implementations, the system can include a reporting tool with some reports such as: award activity summary for a given period; award redemption for a given period; and outstanding award point balance—for use in accounting for the outstanding liability. Additionally, the system may provide the ability to use awards for certain flights and normal revenue fares for other flights and add-on services.

The following are an example use cases for the system. The actors in the use cases can include the following human actors: Traveler, Travel Agent, Call Center Agent, and the Gate Agent. The external system actors can include: GDS Agent, API Agent, and Traveler. The following actors can book travel: Travel Agent—3rd party travel agent using an interface to a carrier's reservation system to book travel for a traveler; a call Center Agent using another interface to book travel and perform other related functions; a GDS Agent—3rd party booking travel through a connected GDS; and an API Agent—3rd party booking travel and perform other related functions through the API (web service) channel.

For UseCase1—frequent flyer program enrollment. The system enables enrollment in the loyalty program through online access, a call center, or an enrollment API.

For UseCase2—send welcome email up enrollment. The system enables sending an email to the passenger with a welcome message including their new frequent flyer account number. This email can be sent upon signup.

UseCase3—Post award points to traveler's account. The system enables posting points for each traveler activity completed. Activity can include flown flights, purchase of points by 3rd party such as a hotel or car company, or completion of certain activities such as use of web check-in.

UseCase4—book award travel. The system enables booking award travel using the available points for the passenger. Booking can include both revenue and award flights with the appropriate "payment" made for each type before the booking can be completed.

UseCase5—account information lookup. The system enables looking up frequent flyer account information from an online interface for a reservation system, an interface accessible by a call center, or through the web services available to third parties and displaying both summary and detailed information on points' activity and status.

UseCase6—Expiration of Points. The system enables expiring points after a configurable length of time following the points being awarded to the traveler.

UseCase7—Award configuration. The system enables administering the number of points given for a given activity, including special award promotions such as bonus points for a certain fare class, certain rout, etc.

UseCase8—Set customer recognition level. The system enables changing a customer's recognition level automatically based on reaching certain configured points level, or through manual over-ride by an agent with appropriate permissions UseCase9—Make customer service/administration adjustments. The system enables providing the ability to review and adjust customer accounts both adding and removing points with appropriate audit trail. This would be used for customer service adjustments and other administrative purposes to change a passenger accounts. This can be limited by role of the user.

UseCase10—View passenger monthly statements. The system enables a passenger to view their account statement on-line in a new account statement page.

UseCase11—create frequent flyer reporting. The system enables the following: creating an award activity summary for a given time period—points awarded by type; an award redemption summary for a given time period—number of points redeemed; and an outstanding award point balance (used for estimating liability for accounting).

UseCase12—Past flight credit adjustment. The system enables the passenger to request award points for a previous flight for which points have not been awarded to the passenger. This could be because the passenger did not have a frequent flyer account or that the booking was made without associating it to their frequent flyer account.

UseCase13—transfer points between loyalty accounts. The system enables transferring points from one passenger's account to another. This function must be limited by role permissions with an audit trail of which agent did the transfer.

UseCase14—Create a new award points rule. The system enables an analyst to use a Rules Engine UI to setup a new award points rule using any of the available criteria in the rule engine.

UseCase15—UnPost award points from traveler's account. The system enables the deduction of points previously posted for a flight in the case where a passenger unboards a flight (such as during an IROP). When the traveler either re-boards the same flight or takes a different flight, the appropriate points will be awarded for the flight actually flown.

UseCase16—Modify a currently active award points rule. The system enables an analyst to update a rule that is currently active. For rule modifications a version will be kept of the rule prior to editing. If the current date is prior to the effective date of the rule being modified, the system may permit the rule to be deleted. If the current date is between the effective and discontinue date of the rule, the original rule may be discontinued as of the current date/time, and the newly modified rule made effective as of the current date/time.

UseCase17—Discontinue an award points rule. The system enables a user to select a rule and discontinue the award points rule by setting the discontinue date of that rule to be a given date/time. That date/time could be today, or another date in the future. The discontinue date cannot be set to a date prior to today.

UseCase18—Delete an award points rule. The system enables the user to select a rule and to delete it. This action may only be possible if the rule has never been activated or if the rule has been discontinued prior to today. If the rule is currently active, a deletion may not be allowed.

In some implementations, the loyalty system may have one or more of the following features: real-time flight activity posting from a reservation system, a rules engine for award points promotions, award redemption online and in the call center, an online account view accessible through the Internet, multiple membership levels, and support for multiple options for points metrics.

Figure 4:
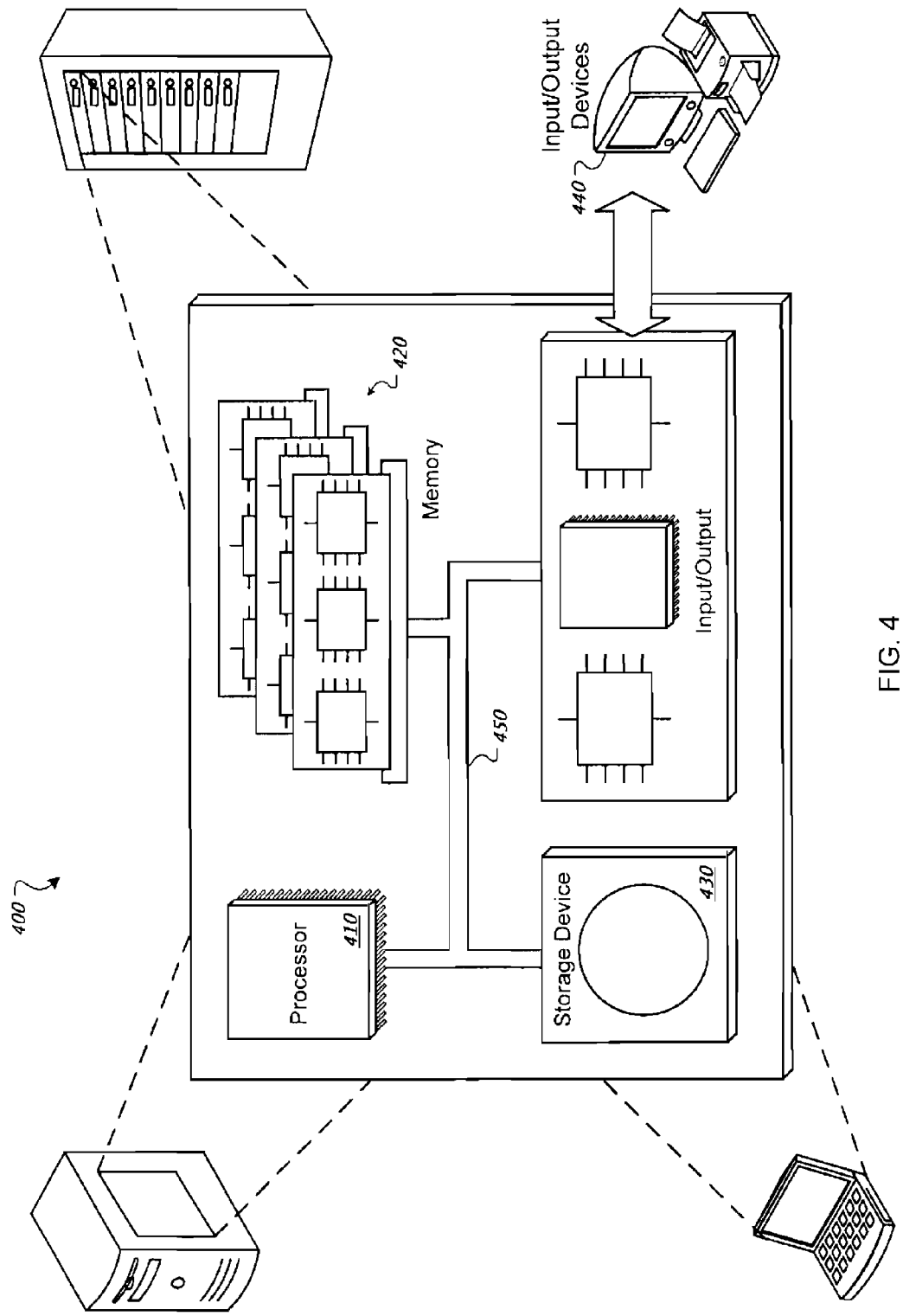
FIG. 4 is a schematic diagram of an exemplary computer system.

FIG. 4 is a schematic diagram of an example computer system 400. The system 400 can be used for the operations described in association with any of the computer-implement methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or other computer readable medium, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, a loyalty program may allow a member to accrue travel reward points substantially in real-time while traveling on a variety of transportation systems (e.g., airplanes, trains, buses, cars, cruise ships, etc.). In some implementations, a loyalty program member can accrue travel reward points into a single customer account, and the reward points can be redeemed for rewards on any of the participating transportation systems. For example, a customer can earn travel reward points substantially in real-time on a flight to a destination city and then redeem the reward points when renting a rental car (e.g., upgrade the car class). In another example, a customer can earn travel reward points substantially in real-time when renting a car in a destination city. The customer can then redeem the reward points on the return flight (e.g., a seat upgrade from coach to first class).

In another implementation, a loyalty program may allow a member to accrue travel reward points substantially in real-time when traveling by airplane and while staying at variety of accommodations (e.g., hotels, motels, bed and breakfasts, inns, campgrounds, etc.). The reward points can be redeemed for rewards at any of the participating accommodations and airlines.

For example, a customer can earn travel reward points substantially in real-time on a flight to a destination city and then redeem the reward points when staying at a participating hotel (e.g., upgrade the customer's room class in order to get a larger room, or a room with a better view). In another example, a customer can earn travel reward points substantially in real-time while staying in a participating motel. The customer can then redeem the reward points on the return flight (e.g., a seat upgrade from coach to first class).

In other implementations, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for updating travel reward points during travel so that the travel reward points are redeemable at a time substantially concurrent with when the travel reward points are earned, the method comprising:
   receiving an indication that a passenger is boarding a carrier for a first segment of a travel itinerary;
   determining, by one or more computers, an amount of travel reward points to associate with the first segment;
   outputting in response to the boarding of the carrier for the first segment, the amount of the travel reward points to a travel reward system so that the travel reward points are available for redemption by the passenger on a second segment of the travel itinerary; and
   processing a request for redemption of the travel reward points by the passenger on the second segment of the travel itinerary.

2. The method of claim 1, wherein determining the amount of travel reward points comprises transmitting, in response to the boarding of the carrier for the first segment, the indication that the passenger is boarding to a rules engine for calculation of the amount of travel reward points based on rules that associate attributes of a travel segment with amounts of travel reward points.

3. The method of claim 1, wherein outputting the amount of the travel reward points to the travel reward system comprises posting the amount to an account associated with the passenger.

4. The method of claim 1, further comprising receiving a second indication that the passenger is de-boarding the carrier before the carrier has departed on the first segment.

5. The method of claim 4, further comprising decrementing the amount of travel reward points from the travel reward system.

6. The method of claim 1, further comprising determining a reward the passenger is eligible for on the second segment using an aggregated amount of travel reward points associated with the passenger, wherein the aggregated amount of travel reward points comprises the amount of travel reward points associated with the first segment and previously accrued travel reward points.

7. The method of claim 6, further comprising outputting an identifier specifying the determined reward for presentation to the passenger.

8. The method of claim 7, wherein outputting the identifier specifying the determined reward comprises displaying the reward to a gate agent associated with the second segment before the passenger has boarded a carrier for the second flight segment.

9. The method of claim 7, wherein outputting the identifier specifying the determined reward comprises displaying the identifier specifying the reward to a user accessing a web page associated with account information for the passenger.

10. The method of claim 1, wherein the carrier is selected from a group consisting of an aircraft, a train, a bus, and a rental car.

11. The method of claim 1, wherein the second segment of the travel itinerary involves a different type of carrier than is used in the first segment of the travel itinerary.

12. The method of claim 1, further comprising redeeming the travel reward points for a seat upgrade on the second segment.

13. The method of claim 1, further comprising redeeming the travel reward points for products or services available on the carrier used in the first travel segment.

14. The method of claim 1, further comprising redeeming the travel reward points for products or services available on a second carrier used in the second travel segment.

15. The method of claim 1, further comprising redeeming the travel reward points for products or services offered by third parties between the first and second segments.

16. The method of claim 1, further comprising redeeming the travel reward points for products or services offered by third parties between the first and second segments.

17. The method of claim 1, further comprising redeeming, after the second segment, the travel reward points for products or services offered by third parties partnering with an operator of the carrier.

18. The method of claim 17, wherein the products or services comprise hotel stays, car rentals, taxi vouchers, or vouchers for food or entertainment.

19. A system for updating travel reward points during travel so that the travel reward points are redeemable at a time substantially concurrent with when the travel reward points are earned, the system comprising:
   one or more computers having
      an accrual module to receive an indication that a passenger is boarding a carrier for a first segment of a travel itinerary;
      a rules engine to determine an amount of travel reward points to associate with the first segment; and
      a database to output, in response to the boarding of the carrier for the first segment, the amount of the travel reward points to a travel reward system so that the travel reward points are available for redemption by the passenger on a second segment of the travel itinerary, wherein the one or more computers process a request for redemption of the travel reward points by the passenger on the second segment of the travel itinerary.

20. A computer program product tangibly embodied in a computer readable storage device, the computer program product including instructions that, when executed, perform operations for updating travel reward points during travel so that the travel reward points are redeemable at a time substantially concurrent with when the travel reward points are earned, the operations comprising:
   receiving an indication that a passenger is boarding a carrier for a first segment of a travel itinerary;
   determining an amount of travel reward points to associate with the first segment;
   outputting, in response to the boarding of the carrier for the first segment, the amount of the travel reward points to a travel reward system so that the travel reward points are available for redemption by the passenger on a second segment of the travel itinerary; and
   processing a request for redemption of the travel reward points by the passenger on the second segment of the travel itinerary.

21. A computer-implemented method for updating travel reward points so that the travel reward points are available for redemption at a time substantially concurrent with when the travel reward points are earned, the method comprising:
   receiving, at a server, a notification that a passenger is boarding at a carrier for a first segment of travel of a travel itinerary;
   determining, using a rules engine executed by the server, an amount of travel reward points to associate with the first segment of travel;
   transmitting a request to credit the determined amount of travel reward points to an electronic account associated with the passenger, wherein the crediting occurs in response to the boarding of the carrier for the first segment so that the travel reward points are available for redemption by the passenger before the first segment of travel is completed; and
   processing a request for redemption of the travel reward points by the passenger on the second segment of the travel itinerary.

* * * * *